United States Patent
Wulf

(10) Patent No.: US 10,184,346 B2
(45) Date of Patent: Jan. 22, 2019

(54) SEAL, METHOD FOR PRODUCING A SEAL AND TURBOMACHINE

(71) Applicant: MTU Aero Engines AG, Munich (DE)

(72) Inventor: Joachim Wulf, Munich (DE)

(73) Assignee: MTU Aero Enginies AAG, Munich (DE)

( * ) Notice: Subject to any disclaimer, the term of this patent is extended or adjusted under 35 U.S.C. 154(b) by 0 days.

(21) Appl. No.: 14/705,132

(22) Filed: May 6, 2015

(65) Prior Publication Data
US 2015/0322808 A1 Nov. 12, 2015

(30) Foreign Application Priority Data
May 9, 2014 (DE) .................. 10 2014 208 801

(51) Int. Cl.
| F01D 11/02 | (2006.01) |
| B23K 15/00 | (2006.01) |
| F01D 11/00 | (2006.01) |
| B22F 3/11 | (2006.01) |
| B22F 3/105 | (2006.01) |

(Continued)

(52) U.S. Cl.
CPC ............ *F01D 11/02* (2013.01); *B22F 3/1055* (2013.01); *B22F 3/11* (2013.01); *B22F 3/115* (2013.01); *B22F 3/1115* (2013.01); *B22F 5/009* (2013.01); *B23K 15/0086* (2013.01); *F01D 11/001* (2013.01); *F01D 11/127* (2013.01); *B33Y 10/00* (2014.12); *B33Y 80/00* (2014.12); *F05D 2220/30* (2013.01); *F05D 2230/11* (2013.01); *F05D 2230/12* (2013.01); *F05D 2230/13* (2013.01); *F05D 2230/311* (2013.01); *F05D 2230/312* (2013.01); *F05D 2230/313* (2013.01); *F05D 2240/55* (2013.01); *F05D 2250/283* (2013.01); *Y02P 10/295* (2015.11)

(58) Field of Classification Search
CPC ...................................... F16J 15/444
See application file for complete search history.

(56) References Cited

U.S. PATENT DOCUMENTS

| 3,957,277 A * | 5/1976 | Margnelli | ............... F01D 11/02 |
| | | | 277/414 |
| 5,705,231 A * | 1/1998 | Nissley | ..................... C23C 4/02 |
| | | | 427/419.3 |

(Continued)

FOREIGN PATENT DOCUMENTS

| DE | 102007031404 A1 | 1/2009 |
| EP | 1573239 B1 | 9/2005 |

(Continued)

*Primary Examiner* — Kristina R Fulton
*Assistant Examiner* — L. Susmitha Koneru
(74) *Attorney, Agent, or Firm* — Barlow, Josephs & Holmes, Ltd.

(57) ABSTRACT

The invention relates to a seal (10) for sealing a gap between a stationary component and a moving component, in particular for sealing a radial gap between a rotor and a stator of a turbomachine, comprising at least one sealing segment (12) with an edge zone (14) facing the gap, whereby the seal (10) is produced layer-by-layer by a free-forming method, in particular a generative or additive method. A plurality of pre-defined weak regions (16) is formed in the edge zone (14) of the sealing segment (12). In addition, the invention relates to a method for producing a seal (10) as well as a turbomachine.

13 Claims, 3 Drawing Sheets

(51) Int. Cl.
   *B22F 3/115*   (2006.01)
   *F01D 11/12*   (2006.01)
   *B22F 5/00*    (2006.01)
   *B33Y 10/00*       (2015.01)
   *B33Y 80/00*       (2015.01)

(56) References Cited

U.S. PATENT DOCUMENTS

| | | | | |
|---|---|---|---|---|
| 6,235,370 B1* | 5/2001 | Merrill | .................. | C23C 4/02 |
| | | | | 29/888.025 |
| 6,343,792 B1* | 2/2002 | Shinohara | ............. | F01D 11/001 |
| | | | | 277/345 |
| 6,846,574 B2* | 1/2005 | Subramanian | ...... | C23C 28/3215 |
| | | | | 428/116 |
| 7,479,328 B2* | 1/2009 | Roth-Fagaraseanu | ...................... | |
| | | | | C23C 28/042 |
| | | | | 415/173.4 |
| 7,563,504 B2* | 7/2009 | Mazzola | ................. | F01D 5/288 |
| | | | | 428/314.2 |
| 7,827,685 B2* | 11/2010 | McMillan | ............. | F01D 11/001 |
| | | | | 277/355 |
| 2003/0174918 A1* | 9/2003 | Suh | .................. | F16C 27/02 |
| | | | | 384/125 |
| 2003/0211354 A1* | 11/2003 | Subramanian | ............ | C23C 4/04 |
| | | | | 428/633 |
| 2008/0279678 A1* | 11/2008 | Merrill | ...................... | F01D 9/06 |
| | | | | 415/173.4 |
| 2010/0143103 A1* | 6/2010 | Sellars | ................... | F16J 15/445 |
| | | | | 415/173.4 |
| 2010/0284797 A1* | 11/2010 | Jarrabet | ................ | F01D 11/122 |
| | | | | 415/174.4 |
| 2011/0103940 A1* | 5/2011 | Duval | .................... | F01D 5/284 |
| | | | | 415/173.4 |
| 2011/0116920 A1* | 5/2011 | Strock | .................... | C23C 28/00 |
| | | | | 415/229 |
| 2012/0007318 A1* | 1/2012 | Lee | .......................... | F01D 11/02 |
| | | | | 277/411 |
| 2015/0354707 A1* | 12/2015 | Inoue | ...................... | F02C 7/28 |
| | | | | 277/355 |

FOREIGN PATENT DOCUMENTS

EP            2620598 A2    7/2013
WO       2004061340 A1    7/2004

\* cited by examiner

SEAL, METHOD FOR PRODUCING A SEAL AND TURBOMACHINE

BACKGROUND OF THE INVENTION

The studies that have led to this invention were supported by the Grant Agreement No. CSJU-GAM-SAGE-2008-001 as part of the Seventh Framework Program of the European Union (RP7/2007-2013).

The invention relates to a seal as well as a method for producing a seal as described in detail below.

Seals, particularly in the form of honeycomb seals, find application, in particular, in so-called gap-support systems in compressor and turbine components of turbomachines. In this case, the seals have the task of keeping to a minimum a sealing gap between a rotating blade system and a housing as well as gaps between a stationary vane system and the rotating rotor hubs, and to thereby guarantee a stable operating performance of the turbomachine with high efficiency. Usually, the rotating components of the turbine comprise sealing fins, which run in against the seals in the known way. This type of honeycomb seal is disclosed by WO 2004/061340 A1. It is known to join honeycomb seals to the corresponding compressor or turbine components by means of mechanical fastening means, by means of brazing, welding, or laser welding. In addition, it is known from EP 1 573 239 B1 or EP 2 620 598 A2 to produce honeycomb seals by means of generative manufacturing methods or thermal spraying methods and/or to introduce them directly onto the compressor or turbine components.

As a disadvantage of the known seals produced by means of generative or additive methods, in particular honeycomb seals, is the circumstance, however, that they must be built up with a minimum wall thickness that is pre-defined by the method parameters. This minimum wall thickness, however, is thicker than the conventionally produced honeycomb seals made of sheet metal, which leads to a poorer run-in behavior. The latter is expressed, for example, by a higher thermal and mechanical stress of the sealing fins at rotors, sealing rings and rotating blades during run-ins of honeycomb seals produced generatively or additively.

BRIEF SUMMARY OF THE INVENTION

The object of the present invention is thus to provide a seal of the type named initially, which assures an improved run-in performance. In addition, it is an object of the present invention to provide a method for producing such a seal, as well as to provide a turbomachine with improved efficiency.

These objects are achieved according to the invention by a seal and by a method for producing a seal as well as a turbomachine according the present invention. Advantageous embodiments with appropriate enhancements of the invention are disclosed herein, whereby advantageous embodiments of the seal are to be viewed as advantageous embodiments of the method or the turbomachine, and vice versa.

A first aspect of the invention relates to a seal for sealing a gap between a stationary component and a moving component, in particular, for sealing a radial gap between a rotor and a stator of a turbomachine, comprising at least one sealing segment with an edge zone facing the gap, whereby the seal is produced layer-by-layer by a free-forming method, in particular a generative or additive method. In this case, a plurality of pre-defined weak regions is formed in the edge zone of the sealing segment. The run-in performance of the seals according to the invention is clearly improved by the targeted weakening of the seal segments in the edge zone during the layer-by-layer production by a free-forming method. A smaller thermal and mechanical stress of the sealing fins at rotors, sealing rings, and rotating blades results during run-in into the seal according to the invention, due to the formation of the weak regions in the edge zone of the sealing segment or of the corresponding seal. In this way, the edge zone can correspond completely or at least partially to the run-in region of the sealing segment or of the seal. For example, it can be formed even larger than the run-in region. In addition, by means of the seal according to the invention, so-called smearing at the seal or the sealing fins will be avoided; smearing, particularly at the sealing fins, can lead to a deeper rub-in into the seal. Finally, the risk of release of larger particles from smearing is also reduced due to the plurality of pre-defined weak regions in the edge zone of the sealing segment or of the seal. The seal according to the invention can be formed as a so-called honeycomb seal; the sealing segments can be formed as so-called honeycomb segments. In this case, the honeycomb segments can have different honeycomb geometries.

In other advantageous embodiments of the seal according to the invention, the weak regions are disposed in one or more planes that run approximately parallel to an edge of the sealing segment facing the gap. A particularly uniform weakening of the edge zone results thereby, whereby in turn an improved run-in performance is assured. The possibility also exists that the plurality of weak regions forms a weak zone, the weak zone in turn being formed in such a way that a uniform and/or non-uniform weakening of the edge zone results in the axial and/or radial dimension of the sealing segment and/or of the seal. Due to the plurality of possible configurations of the weak zone, it is advantageously possible to individually adapt it or adapt the sealing segment and the corresponding seal to pre-specified sealing parameters. The run-in performance of the seal according to the invention can thus be adapted to pre-specified parameters or requirements without anything further.

In other advantageous embodiments of the seal according to the invention, the weak regions are designed linear and/or punctiform and/or circular and/or arc-shaped. However, other forms of weak regions are also conceivable and can be used without anything further. In this case, the weak regions in honeycomb walls of the sealing segment can be designed as continuous and/or non-continuous. In addition, the possibility exists that the radial distance of the weak regions to one another at least corresponds to the thickness of one component layer of the seal. Finally also, the shape and/or the size and/or the length and/or the frequency of the weak regions in the edge zone are constant or variable. It is clear that an optimized adjustment of the run-in performance of the sealing segment or of the seal is possible via the plurality of variation possibilities relative to the configuration and arrangement of the weak regions in the edge zone of the sealing segment or of the seal.

A second aspect of the present invention relates to a method for producing a seal for sealing a gap between a stationary component and a moving component, in particular for sealing a radial gap between a rotor and a stator of a turbomachine, wherein the seal has at least one sealing segment with an edge zone facing the gap, and the seal is produced layer-by-layer by a free-forming method, in particular a generative or additive method. During the production of the edge zone, in this case, a plurality of weak regions is formed by a variation, in particular a reduction and/or an interruption of a thermal and/or kinetic energy input into at least one material layer for the formation of a component layer of the seal. The method according to the invention assures a simple and reliable formation of pre-defined weak regions in the edge zone of the sealing segment or of the seal, which also comprises the run-in region of the sealing segment or of the seal. By forming the plurality of weak regions, the run-in performance of seals produced layer-by-layer by means of free-forming methods, particularly generative or additive methods, is significantly improved. In this case, variation of the thermal and/or kinetic energy input is understood to be that the energy input will be less than 100% of the amount of energy required for melting and/or sintering individual material particles with each other. The energy input can be reduced down to 0%, so that in this case an interruption of the energy input takes place. The relative weakening of the respective weak regions when compared to normally joined, i.e., melted and/or sintered regions of the edge zone, can be adjusted by varying and/or interrupting the thermal and/or kinetic energy input. The seal can be formed as a so-called honeycomb seal; the sealing segments can be formed as so-called honeycomb segments. In this case, the honeycomb segments can have different honeycomb geometries.

In an advantageous embodiment of the method according to the invention, the free-forming method is a generative method and comprises at least the following steps:

a) layer-by-layer application of at least one powder-form material on at least one component platform in the region of a construction and joining zone; and b) layer-by-layer and local melting and/or sintering of the material by introducing energy by means of at least a high-energy beam in the region of the construction and joining zone for the formation of a component layer of the seal, wherein, during the production of the edge zone in pre-specified component layers of the seal, the variation, particularly the reduction in the power of the high-energy beam and/or the interruption of the high-energy beam is produced for the formation of the weak regions.

The interruption of the high-energy beam, for example, can be produced sequentially linearly or on a surface area. In this way, net-form or grid-form weak regions can be created. The weakening of the layer bonding, however, can also be produced by repeated local variation of the power of the high-energy beam during exposure of the powder-form material. In this case, the high-energy beam may involve a laser beam or an electron beam. This type of method according to the invention makes possible the relatively simple, generative construction of a seal with improved run-in performance.

In other advantageous embodiments of the method according to the invention, the free-forming method is a high-speed flame spraying method or a cold gas spraying method, wherein, during the production of the edge zone in pre-specified component layers of the seal, the variation, particularly the reduction of the energy input by a reduction in the particle speed of a powder-form material, is produced for the formation of the component layer, and/or the interruption of the particle application is produced for the formation of the weak regions. Variation, particularly the reduction of the energy input in this case is understood to be a reduction in the particle speed when compared to a minimum velocity required for the adherence of the material particles to one another. In addition, the possibility exists that the free-forming method is a deposition welding method, in particular a laser-powder deposition welding method or an electron-beam welding method. Other generative or additive manufacturing methods are also conceivable. By means of the method according to the invention, it is possible to simply and rapidly produce seals with improved run-in performance.

A third aspect relates to a turbomachine, in particular a gas turbine, whereby the latter at least comprises a seal of the type described in the preceding. The turbomachine according to the invention has a more stable operating behavior based on seals with improved run-in performance and a high efficiency is guaranteed.

BRIEF DESCRIPTION OF THE DRAWINGS

Additional features of the invention result from the claims, the exemplary embodiments, as well as on the basis of the drawings. The features and combinations of features named above in the description as well as the features and combinations of features named in the exemplary embodiments that follow can be used not only in the combination indicated in each case, but also in other combinations, without departing from the scope of the invention. Here:

DETAILED DESCRIPTION OF THE INVENTION

Figure 1:
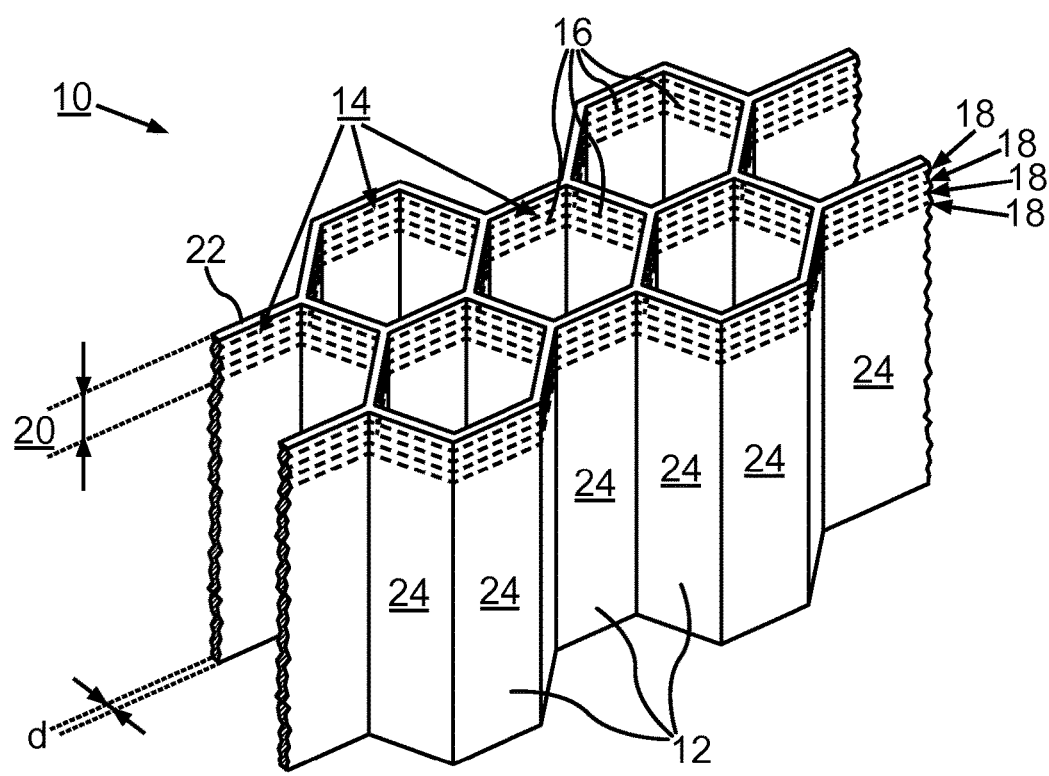
FIG. 1 shows a schematic representation of a seal according to the invention.

FIG. 1 shows a schematic representation of a seal 10 for sealing a gap between a stationary component and a moving component, in particular for sealing a radial gap between a rotor and a stator of a turbomachine, The seal 10 comprises a plurality of sealing segments 12, each of which has an edge zone 14 facing the gap to be sealed (not shown). In the embodiment example shown, the seal 10 is shown as a so-called honeycomb seal. The sealing segments 12 in this case form honeycomb segments. These honeycomb segments are shown with a hexagonal honeycomb geometry in the embodiment example. It is also possible, however, that the segments have a different honeycomb geometry. The seal 10 is produced layer-by-layer by means of a free-forming method, in particular a generative or additive method.

The edge zone 14 also comprises the so-called run-in region of the seal 10 or of the individual sealing segments 12. It can be recognized that a plurality of pre-defined weak regions 16 are formed in the edge zones 14 of the sealing segments 12. In this case, the weak regions 16 are disposed in several planes 18, which run approximately parallel to an edge 22 of the sealing segment 12 facing the gap to be sealed. In the embodiment example shown, the weak regions 16 are formed linearly, i.e., they form a linear weakening of the wall cross sections of the sealing segments 12. Also, the weak regions 16 are formed continuous in the honeycomb walls 24 of the sealing segment 12. The wall thickness d of the honeycomb walls 24 is aimed at the necessary minimum wall thickness of the manufacturing method used. Different minimum wall thicknesses that are pre-specified by the method parameters result for different generative or additive manufacturing methods. The individual weak regions 16 in this case are formed during the implementation of the free-forming method in at least one material layer for the formation of an individual component layer of the seal 10 or of the sealing segments 12 by means of a variation, in particular a reduction and/or an interruption of a thermal and/or kinetic energy input. In addition, it is recognized that the plurality of weak regions 16 overall forms a weak zone 20, the weak zone 20 in the embodiment example shown being formed in such a way that a uniform weakening of the edge zone 14 results in the axial and radial dimensions of the sealing segment 12 and of the corresponding seal 10 (see also FIG. 3). In the exemplary embodiment shown, the weak regions 16 are formed as linear recesses in the honeycomb walls 24. It is also possible, however, that the weak regions 16 are made to be punctiform and/or circular and/or arc-shaped. Other forms are also conceivable. Also, the shape and/or the size and/or the length and/or the frequency of the weak regions 16 can be formed constant or variable in the edge zone 14. The radial distance of the weak regions 16 to one another in this case amounts to at least the thickness of one component layer of the seal 10.

Figure 2:
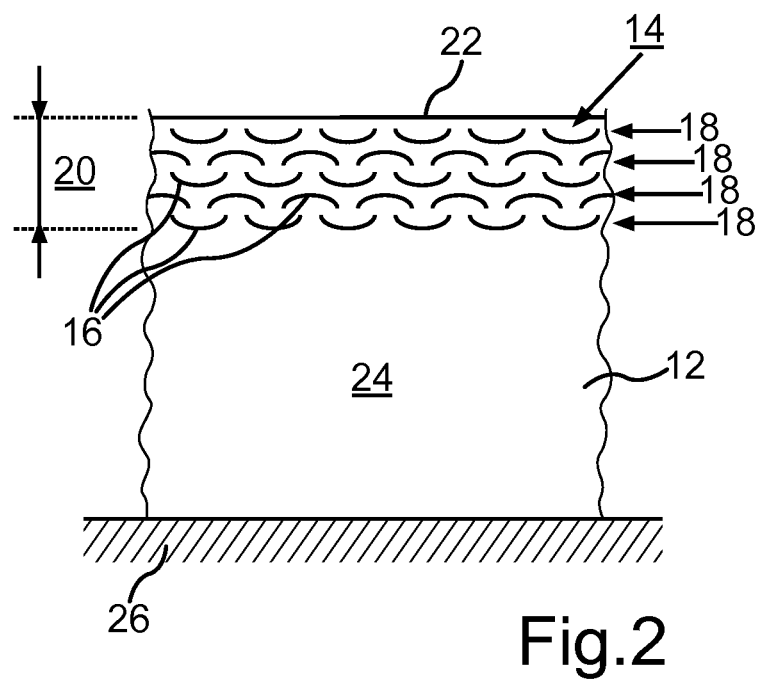
FIG. 2 shows a schematic representation of a partial region of a seal according to the invention according to another embodiment.

FIG. 2 shows a schematic representation of a partial region of a seal 10 according to the invention according to another embodiment. It is recognized that in turn, a plurality of weak regions 16 are disposed in several planes 18 approximately parallel to the edge 22 of the sealing segment 12. In this case, the individual weak regions 16 are designed arc-shaped and form continuous openings in the honeycomb wall 24. Also, the arc-shaped weak regions 16 are disposed alternating as concave or convex from one plane 18 down to a plane 18 lying thereunder. Overall, the plurality of weak regions 16 in turn forms the weak zone 20, which, in this exemplary embodiment, leads to a uniform weakening of the edge zone 14 in the axial and radial dimensions of the sealing segment 12.

Figure 3:
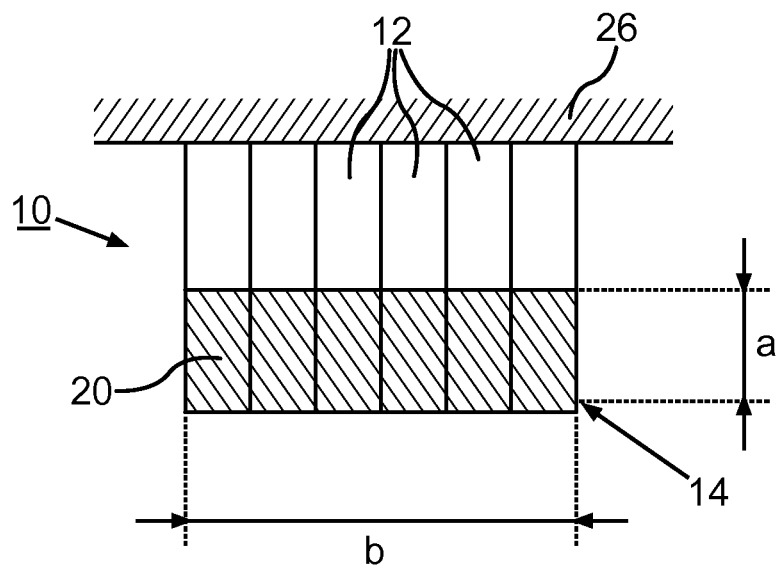
FIG. 3 shows a schematic representation of a seal according to the invention according to another embodiment.

FIG. 3 shows a schematic representation of a seal 10 according to another embodiment. It is recognized that the seal 10 is composed of a plurality of sealing segments 12, which in turn have corresponding edge zones 14, which overall form an edge zone of the seal 10. It is recognized that the weak zone 20 composed of a plurality of weak regions 16 (not shown), weak zone 20 in turn comprising the run-in region of the seal 10, is formed in such a way that a uniform weakening of the honeycomb package results over the entire axial dimension a and a uniform weakening results in the radial direction b. In addition, it is recognized that the seal 10 is disposed on a substrate 26. In this case, the possibility exists that the seal 10 is produced in one piece, i.e., is produced in one piece and joined with the substrate 26 by means of a free-forming method. It is also possible, however, that the seal 10, is joined to the substrate 26 via a mechanical bonding, by brazing or other fastening mechanisms. This applies also correspondingly to the seals 10 shown in FIGS. 4 and 5.

Figure 4:
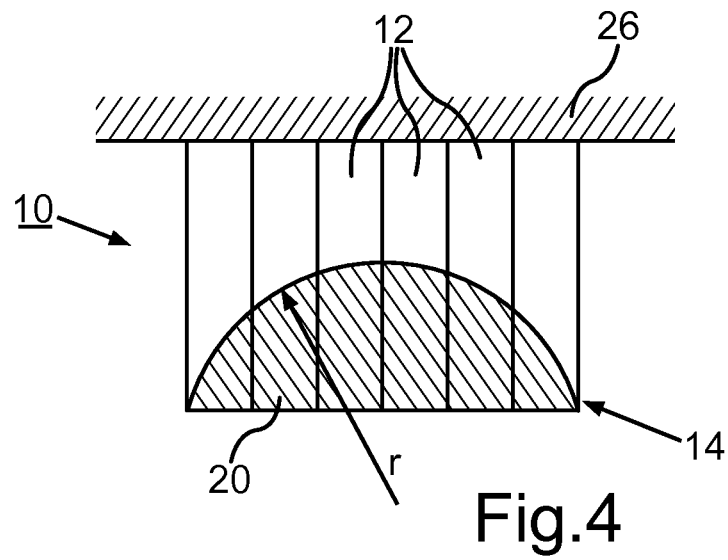
FIG. 4 shows a schematic representation of a seal according to the invention according to another embodiment.

FIG. 4 shows a schematic representation of a seal 10 according to another embodiment. It is recognized that the weak zone 20 composed of a plurality of weak regions 16 (not shown) is formed in such a way that a variation of the degree of weakening of the weak zone 20 results in the radial direction over the axial extent of the seal 10. In the exemplary embodiment shown, the weak zone 20 has the form of a partial circle with a radius r.

Figure 5:
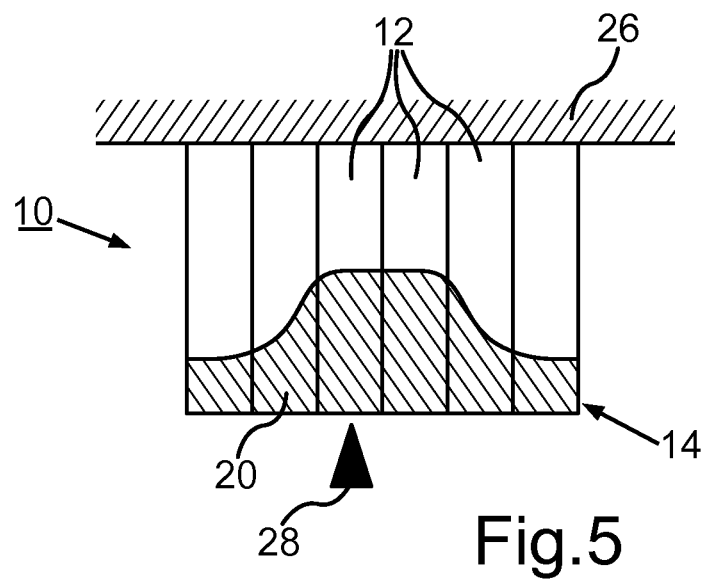
FIG. 5 shows a schematic representation of a seal according to the invention according to another embodiment.

FIG. 5 shows a schematic representation of a seal 10 according to another embodiment. In this exemplary embodiment, the weak zone 20 composed in turn of a plurality of weak regions 16 (not shown) is adapted to a locus curve of a sealing fin 28 during operation. A variation of the degree of weakening of the weak zone 20 is recognized in turn in the radial direction of the seal 10 over its axial extent.

The materials used for the production of the described seals 10, particularly the powder-form materials, are composed of metal, metal alloys, plastic and/or ceramics. Details relative to the production of seals by means of free-forming methods and for the materials used are known from the relevant literature.

The invention claimed is:

1. A seal for sealing a radial gap between a rotor and a stator of a turbomachine, comprising a substrate; at least one sealing segment disposed on the substrate, the sealing segment having an edge zone facing the radial gap, whereby the seal is produced layer-by-layer by a free-forming generative or additive method of a material; and a plurality of pre-defined weak regions, configured as a plurality of recesses having a different minimum wall thickness than the remainder of the sealing segment, wherein the plurality of the pre-defined weak regions are provided in the edge zone of the sealing segment; the edge zone being a run-in region of the sealing segment; the plurality of pre-defined weak regions being integrally located within each of the at least one sealing segment;

wherein the weak regions are disposed in one or more planes integrally within each of the at least one sealing segment, which run approximately parallel to an edge facing the radial gap of the sealing segment; the edge, with the weak regions in the edge zone thereof, being a run-in seal surface, and wherein the seal is monolithic.

2. The seal according to claim 1, wherein the plurality of weak regions forms a weak zone, whereby the weak zone is located integrally within each of the at least one sealing segment and formed whereby uniform and/or a non-uniform weakening of the edge zone results in the axial and/or radial dimension(s) of the at least one sealing segment and/or of the seal.

3. The seal according to claim 1, wherein the plurality of pre-defined weak regions are configured to be linear and/or punctiform and/or circular and/or arc-shaped.

4. The seal according to claim 1, wherein the plurality of pre-defined weak regions are configured to be continuous and/or non-continuous and integrally located within honeycomb walls of each of the at least one sealing segment.

5. The seal according to claim 1, wherein the radial distance of the plurality of pre-defined weak regions to one another corresponds to at least the thickness of one component layer of the seal.

6. The seal according to claim 1, wherein the shape and/or the size and/or the length and/or the frequency of the plurality of pre-defined weak regions in the edge zone is/are constant or variable.

7. A method for producing a seal for sealing a radial gap between a rotor and a stator of a turbomachine, whereby the seal has a substrate and at least one sealing segment disposed on the substrate with an edge zone facing the radial gap and the seal is produced layer-by-layer by a free-forming method, in particular a generative or additive method of one material, wherein during the production of the edge zone, the edge zone being a run-in region of the sealing segment, a plurality of weak regions are formed by a reduction and/or an interruption of a thermal and/or kinetic energy input into at least one material layer for the formation of a component layer of the seal, wherein the weak regions are formed as a plurality of recesses having a different minimum wall thickness than the remainder of the sealing segment in one or more planes integrally within each of the at least one sealing segment and which run approximately parallel to an edge facing the radial gap of the at least one sealing segment, the edge, with the plurality of pre-defined weak regions being provided in the edge zone thereof, being a run-in seal surface, and wherein the seal is monolithic.

8. The method according to claim 7, wherein the free-forming method is a generative method and comprises at least the following steps:
   a) layer-by-layer application of at least one powder-form material on at least one component platform in the region of a construction and joining zone; and
   b) layer-by-layer and local melting and/or sintering of the material by introducing energy by means of at least a high-energy beam in the region of the construction and joining zone for the formation of a component layer of the seal, whereby, during the production of the edge zone in pre-specified component layers of the seal, the variation, in particular the reduction in the power of the high-energy beam and/or the interruption of the high-energy beam is produced for forming the plurality of pre-defined weak regions.

9. The method according to claim 8, wherein the interruption of the high-energy beam is produced sequentially linearly or on a surface area.

10. The method according to claim 8, wherein the high-energy beam is a laser beam or an electron beam.

11. The method according to claim 7, wherein the free-forming method is a high-speed flame spraying method or a cold gas spraying method and, during the production of the edge zone in pre-specified component layers of the seal, the variation, in particular the reduction of the energy input by a reduction in the particle speed of a powder-form material, is produced for the formation of the component layer, and/or the interruption of the particle application is produced for the formation of the plurality of pre-defined weak regions.

12. The method according to claim 7, wherein the free-forming method is a laser-powder deposition welding method or an electron-beam welding method.

13. The seal according to claim 1, wherein the seal is configured and arranged for use in a turbomachine.

* * * * *